United States Patent Office 2,964,140
Patented Dec. 13, 1960

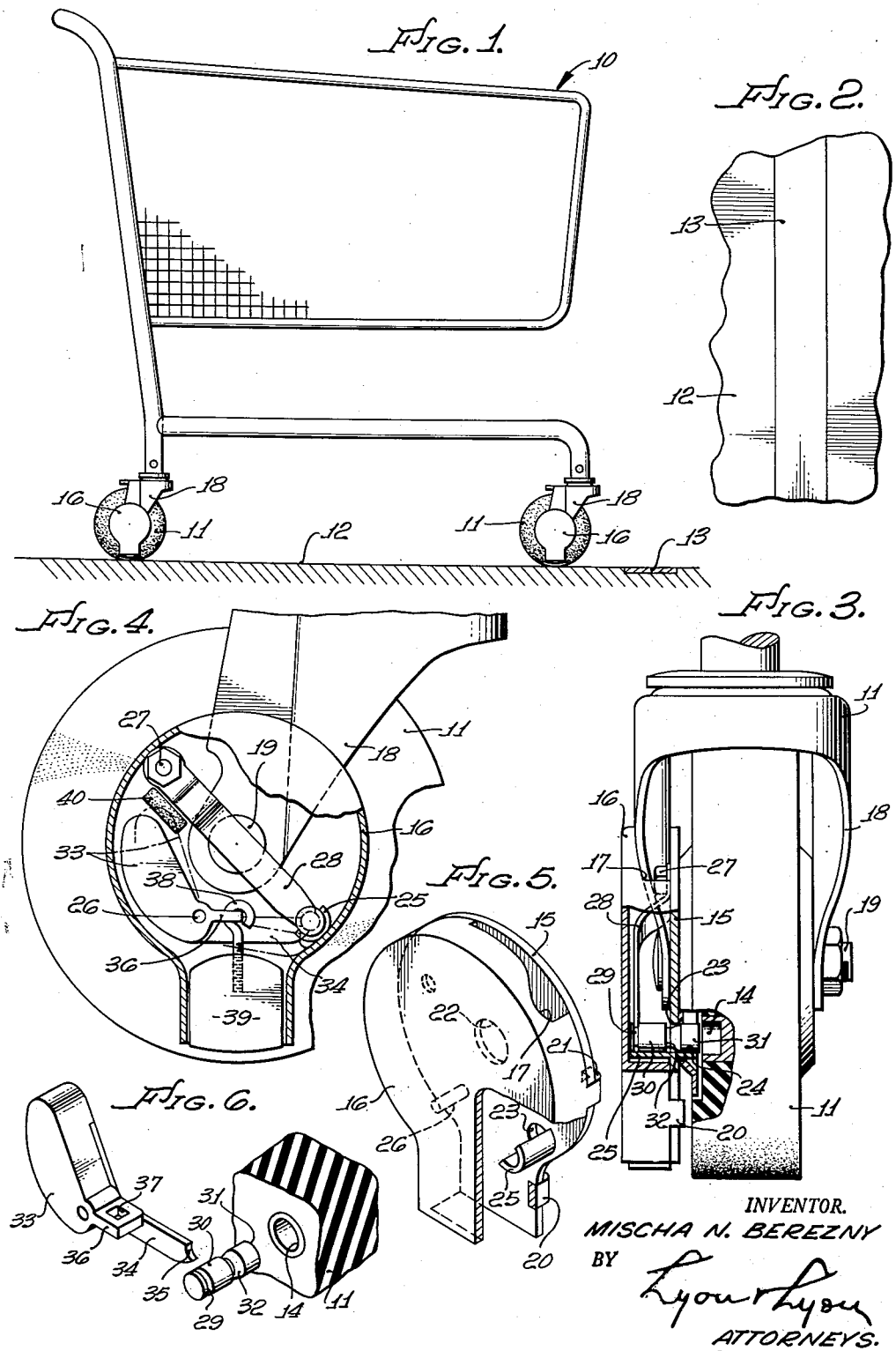

2,964,140

ANTI-THEFT DEVICE FOR CARTS

Mischa N. Berezny, Huntington Park, Calif., assignor to Gilbert Florence and Harold Florence, both of Los Angeles, Calif.

Filed Sept. 14, 1959, Ser. No. 839,789

3 Claims. (Cl. 188—111)

This invention relates to carts and more particularly to the type of cart commonly made available at supermarkets and the like for the use of customers. Such carts are used in large numbers and are made available to the customers not only for transporting merchandise which has been purchased about the premises of the store, but it is common to permit the carts to be used for transporting purchased merchandise to the customers' automobiles on the parking lot adjacent the market, and it has been found that in a significant number of cases the cart tends to disappear along with the merchandise, and it an object of this invention to provide a means which will prevent the cart from being taken off the premises of the super-market.

It is accordingly one object of this invention to provide means for locking the wheels of carts when the same are taken out of designated areas.

To this end, it is a feature of this invention that surrounding the authorized parking lot of a market, magnetic material is imbedded in the pavement, and means are associated with the wheels of the carts to cause the wheels to become locked in the event the wheel is caused to be transported on or past the magnetic material.

It is another feature of this invention that the wheels may be reset after once having been locked very quickly and readily by one possessing the correct tool but may not be reset by the casual customer.

These and other objects, features and advantages will be apparent from the annexed specification, in which:

Figure 1 is a side view of a grocery cart equipped with the present invention.

Figure 2 is a plan view of a portion of pavement showing the magnetic strip.

Figure 3 is an enlarged end view partly in section with parts broken away for clarity of illustration of one wheel of the cart equipped with the present invention.

Figure 4 is a side view of the device shown in Figure 3 with the cover removed.

Figure 5 is a perspective elevation with parts broken away for clarity of illustration of the casing employed in the present invention.

Figure 6 is a perspective exploded view of parts of the present invention.

Referring now more particularly to the drawings, there is shown a grocery cart indicated generally by the numeral 10 having a plurality of wheels 11 of the caster type equipped with the present invention. The cart 10 is adapted to be wheeled about a paved area 12, the perimeter of which is circumscribed by a continuous strip of magnetic material 13 which is imbedded in the pavement 12 as shown in Figures 1 and 2. The wheels 11, per se, are conventional and will not be further described. However, each wheel in accordance with the present invention is unique in that it is provided with a series of circumferentially spaced sockets 14. The invention contemplates ataching to the wheel a device including a casing comprising a plate 15 and a non-magnetic cover 16. An irregular slot 17 is formed in the cover to accommodate the flange 18 of the wheel, and after the plate 15 has been placed in position, the bolt 19 having been removed, the cover 16 is placed in position and secured to the plate 15 by bending the tabs 20 and 21 about the plate 15. The plate 15 is provided with a hole 22 adapted to receive the bolt 19.

An aligned hole 24 is drilled in the wheel hub. The plate 15 carries a half cylindrical spacer 25 and a pin 26. Mounted on the plate 15 as by screw 27 is a leaf spring 28. The leaf spring 28 has its outer end engaging a groove 29 formed in a pin 30. Leaf spring 28 constantly biases pin 30 toward the wheel and constantly tends to force the end 31 of pin 30 into one or the other of the circumferentially spaced sockets 14. Pin 30 is provided with a second groove 32.

Pivotally mounted about the pin 26 is a weight 33. The weight 33 forms one arm of a bell crank, the other arm 34 of which has its outer end notched as at 35 for releasable engagement in the groove 32 of pin 30. The bell crank also carries a bracket 36 having a hole 37 therein which receives the hook 38 carried by a magnet 39.

The operation of the above-described device is as follows: In normal operation, the parts will be in the position shown in Figures 3 and 4 in which the wheels are free to rotate. Should, however, the wheel pass over one of the magnetic strips 13, the magnet 39 will be attracted thereto, thus pivoting the weight 33 in a clockwise direction (Figure 4). This releases the notched end 35 of arm 34 from groove 32 of pin 30. Having thus been released, the pin 30 is free to travel to the right (Figure 3) under the force of leaf spring 28 and to enter the first of the sockets 14 which comes within its path, thus locking the wheel against further travel. The wheel will remain so locked and consequently the cart will not be movable until the parts are returned to wheel rotating position. It is contemplated that to do this, the operator will withdraw the pin 31 to latched position by means of a separate hand-operated magnet, and as the casual customer is not habitually equipped with a magnet, it is obvious that only authorized personnel will be equipped to restore the wheel to operative condition.

In order to minimize wear, a sponge rubber cushion 40 may be glued to the plate 15 to operate as a stop. From the foregoing, it will be seen that there has been described a device which will lock the wheels of the cart 10 whenever it is attempted to take the cart out of the prescribed area surrounded by the magnetic strips 13.

While there has been described what is at present considered the preferred embodiment of the invention, it will be understood by those skilled in the art that various changes and alterations may be made therein without departing from the essence of the invention and it is intended to cover herein all such changes and alterations as come within the true spirit and scope of the annexed claims.

I claim:

1. An anti-theft device for carts to confine the same within an area bounded by a magnetic material perimeter comprising: a wheel mount on said cart; a wheel carried by said mount; means carried by said wheel mount and adapted to engage said wheel to lock said wheel against rotation; means carried by said wheel mount and normally holding said locking means in inoperative position; and magnetic means carried by said wheel mount and actuated by passage of magnetic material to release said locking means from inoperative position.

2. An anti-theft device for carts to confine the same within an area bounded by a magnetic material perimeter comprising: a wheel mount on said cart; a wheel carried by said mount; locking means carried by said wheel mount and adapted to engage said wheel to lock said wheel against rotation; spring means carried by said wheel mount engaging said locking means and constantly biasing said locking means toward locking engagement with said wheel; means carried by said wheel mount and normally holding said locking means in inoperative position; and magnetic means carried by said wheel mount and actuated by passage of magnetic material to release said locking means from inoperative position.

3. An anti-theft device for carts to confine the same within an area bounded by a magnetic material perimeter comprising: a wheel mount on said cart; a wheel carried by said mount; a plurality of circumferentially spaced sockets formed in said wheel; a pin carried by said wheel mount and adapted to engage said wheel sockets to lock said wheel against rotation; a detent carried by said wheel mount and normally engaging said pin holding said pin from movement toward said sockets; and magnetic means carried by said wheel mount and actuated by passage of magnetic material to release said locking means from inoperative position.

No references cited.